(12) United States Patent
Faust et al.

(10) Patent No.: US 8,175,549 B2
(45) Date of Patent: May 8, 2012

(54) CLOSED LOOP TRANSMITTER IQ CALIBRATION

(75) Inventors: Roi Faust, Ra'anana (IL); Gregory Lerner, Petach Tikya (IL); Nir Tal, Haifa (IL)

(73) Assignee: Texas Instruments Incorporated, Dallas, TX (US)

( * ) Notice: Subject to any disclaimer, the term of this patent is extended or adjusted under 35 U.S.C. 154(b) by 842 days.

(21) Appl. No.: 12/253,410

(22) Filed: Oct. 17, 2008

(65) Prior Publication Data
US 2010/0099363 A1 Apr. 22, 2010

(51) Int. Cl.
*H04B 17/00* (2006.01)
*H04B 1/04* (2006.01)
(52) U.S. Cl. ............ 455/91; 455/67.13; 455/114.2; 455/115.1; 455/126; 455/127.1
(58) Field of Classification Search ........... 455/76.11, 455/67.13, 67.14, 67.16, 67.7, 91, 114.2–115.2, 455/126–127.2, 67.11; 375/296–298
See application file for complete search history.

(56) References Cited

U.S. PATENT DOCUMENTS

| | | | |
|---|---|---|---|
| 6,396,345 B2 * | 5/2002 | Dolman | 330/149 |
| 6,697,436 B1 * | 2/2004 | Wright et al. | 375/296 |
| 7,522,672 B2 * | 4/2009 | Saed | 375/260 |
| 7,548,591 B2 * | 6/2009 | Parsa et al. | 375/298 |
| 7,760,817 B2 * | 7/2010 | Lin | 375/302 |
| 7,831,220 B2 * | 11/2010 | Hammerschmidt et al. | 455/114.1 |
| 7,881,402 B2 * | 2/2011 | Gao et al. | 375/296 |
| 7,974,593 B2 * | 7/2011 | Cole et al. | 455/114.3 |
| 2003/0058959 A1 * | 3/2003 | Rafie et al. | 375/296 |
| 2005/0226346 A1 * | 10/2005 | Ode et al. | 375/296 |
| 2006/0009171 A1 * | 1/2006 | Xu et al. | 455/114.2 |
| 2007/0092023 A1 * | 4/2007 | Kang et al. | 375/281 |
| 2008/0130780 A1 | 6/2008 | Cho et al. | 375/267 |
| 2009/0042521 A1 * | 2/2009 | Otaka et al. | 455/126 |

OTHER PUBLICATIONS

J. Tubbax et al., "Compensation of Transmitter IQ Imbalance for OFDM Systems," IEEE International Conference on Acoustics, Speech, and Signal Processing (ICASSP) 2004, Sep. 2004, pp. II-325 to II-328.

* cited by examiner

*Primary Examiner* — Simon Nguyen
(74) *Attorney, Agent, or Firm* — Alan A. R. Cooper; Wade James Brady, III; Frederick J. Telecky, Jr.

(57) ABSTRACT

A novel and useful apparatus for and method of closed loop IQ calibration for use in a transmitter. The IQ calibration mechanism functions to provide calibration of IQ imbalance in the presence of real world RF impairments. An iterative process is used to update the gain and phase mismatch values whereby the metrics are calculated in a differential manner without the need for calculation absolute imbalance values. At each iteration, updating the gain and phase mismatch estimate requires only the direction of the correction to be determined. The direction of the correction is calculated using only the differences between output power measurements. The updated gain and phase mismatch estimates are used to update an IQ correction matrix. This process is repeated until a desired stopping criterion is reached. Gear shifting is used to ensure quick convergence of the algorithm while providing the ability to achieve any desired level of accuracy.

28 Claims, 9 Drawing Sheets

CLOSED LOOP TRANSMITTER IQ CALIBRATION

FIELD OF THE INVENTION

The present invention relates to the field of data communications and more particularly relates to an apparatus for and method of closed loop IQ calibration for use in a transmitter.

BACKGROUND OF THE INVENTION

Ultra-Wideband (UWB) is a technology for transmitting information spread over a large bandwidth (>500 MHz) that can share spectrum with other users. Current Federal Communications Commission (FCC) rules are intended to provide an efficient use of radio bandwidth while enabling both high data rate personal area network (PAN) wireless connectivity and longer-range, low data rate applications as well as radar and imaging systems.

Although Ultra Wideband was originally pulse radio, the FCC and ITU-R currently define UWB in terms of a transmission from an antenna for which the emitted signal bandwidth exceeds the lesser of 500 MHz or 20% of the center frequency. Thus, pulse-based systems, wherein each transmitted pulse instantaneously occupies the UWB bandwidth, or an aggregation of at least 500 MHz of narrow band carriers, such as in orthogonal frequency division multiplexing (OFDM), can access the UWB spectrum. Each pulse in a pulse-based UWB system occupies the entire UWB bandwidth, thus reaping the benefits of relative immunity to multipath fading (but not to intersymbol interference), unlike narrowband carrier-based systems that are subject to both deep fades and intersymbol interference. In the United States, the FCC has mandated that UWB radio transmission may operate in the range from 3.1 GHz to 10.6 GHz, at a transmit power of −41 dBm/MHz.

Ultrawideband (UWB) is a wireless communications technology that operates in unlicensed spectrum. Advantages of UWB include low power consumption, very low cost/complexity, high data rates (up to 480 Mbps) and throughput and precision location capability. The specifications for UWB target emerging wireless personal area network (WPAN) communications. WPAN technology enables high-speed, short-range, cable-free connectivity for a wide array of multimedia consumer electronics, PC peripherals and mobile devices, including wireless USB and wireless 1394.

For example, several intended uses for UWB include sharing photos, music, video, data and voice among networked consumer electronics, PCs and mobile devices throughout the home and also remotely. For example, using UWB links, users will be able to stream video content from a PC or consumer electronics (CE) device such as a camcorder, DVD player or personal video recorder (PVR) to a flat screen high-definition television (HDTV) display without the use of any wires.

The digital home includes high-speed data transfer for multimedia content, short-range connectivity for transfer to other devices, low power consumption due to limited battery capacity and low complexity and cost. Example applications include transfer of video from a camcorder to an entertainment PC, the ability to view photos from the user's digital still camera on a larger display, removing all wires to and between printers, scanners, mass storage devices and portable CE audio/video (A/V) devices.

A traditional UWB transmitter works by sending billions of pulses across a very wide spectrum of frequency several GHz in bandwidth. The receiver then translates the pulses into data by listening for a familiar pulse sequence sent by the transmitter. Modern UWB systems use other modulation techniques, such as Orthogonal Frequency Division Multiplexing (OFDM), to occupy these extremely wide bandwidths. In addition, the use of multiple bands in combination with OFDM modulation can provide significant advantages to traditional UWB systems. The MultiBand OFDM approach allows for good coexistence with narrowband systems such as 802.11a, adaptation to different regulatory environments, future scalability and backward compatibility. This allows the technology to comply with local regulations by dynamically turning off subbands and individual OFDM tones to comply with local rules of operation on allocated spectrum.

With the formation of the MultiBand OFDM Alliance (MBOA) in June 2003, OFDM for each subband was added to the initial multiband approach in order to develop the best technical solution for UWB. To date, the Multiband OFDM Alliance has more than 170 member that support a single technical proposal for UWB. The MBOA is tasked with delivering the best overall solution for UWB with maximum emphasis on peaceful coexistence with other wireless services and to provide the most benefits to the broadest number of consumers end users. In the MultiBand OFDM approach, the available spectrum of 7.5 GHz is divided into several 528-MHz bands. This allows the selective implementation of bands at certain frequency ranges while leaving other parts of the spectrum unused. The dynamic ability of the radio to operate in certain areas of the spectrum is useful because it can adapt to regulatory constraints imposed by governments around the world.

The band plan for the MBOA proposal has five logical channels. Channel 1, which contains the first three bands, is mandatory for all UWB devices and radios. Multiple groups of bands enable multiple modes of operation for MultiBand OFDM devices. In the current MultiBand OFDM Alliance proposal, bands 1 to 3 are used for Mode 1 devices (mandatory mode), while the other remaining channels (2 to 5) are optional. There are up to four time-frequency codes per channel, thus allowing for a total of 20 piconets with the current MBOA proposal. In addition, the proposal also allows flexibility to avoid channel 2 when and if Unlicensed-National Information Infrastructure (U-NII) interference, such as from 802.11a, is present.

The information transmitted on each band is modulated using OFDM. OFDM distributes the data over a large number of carriers that are spaced apart at precise frequencies. This spacing provides the orthogonality in this technique, which prevents the demodulators from seeing frequencies other than their own. The benefits of OFDM are high-spectral efficiency, resiliency to RF interference and lower multipath distortion.

OFDM is a frequency-division multiplexing (FDM) scheme utilized as a digital multi-carrier modulation method. A large number of closely-spaced orthogonal sub-carriers are used to carry data. The data are divided into several parallel data streams or channels, one for each sub-carrier. Each sub-carrier is modulated with a conventional modulation scheme (such as quadrature amplitude modulation or phase shift keying) at a low symbol rate, maintaining total data rates similar to conventional single-carrier modulation schemes in the same bandwidth.

In OFDM, the sub-carrier frequencies are chosen so that the sub-carriers are orthogonal to each other, meaning that cross-talk between the sub-channels is eliminated and inter-carrier guard bands are not required. This greatly simplifies the design of both the transmitter and the receiver; unlike conventional FDM, a separate filter for each sub-channel is not required. OFDM, however, requires very accurate frequency synchronization between the receiver and the transmitter; with frequency deviation the sub-carriers will no longer be orthogonal, causing inter-carrier interference (ICI), i.e. cross-talk between the sub-carriers. Frequency offsets are typically caused by mismatched transmitter and receiver oscillators, or by Doppler shift due to movement. In most OFDM radio designs, a zero-IF scheme is used to convert the RF signal into a baseband signal without use of an intermediate frequency (IF) in the receiver and to convert the baseband signal into an RF signal without an IF in the transmitter. Being an OFDM based system, UWB uses the well-known zero-IF architecture for both receive (RX) and transmit (TX). A zero-IF transmitter, however, has disadvantages in that it is impossible to generate I and Q signal that are perfectly balanced through the upconverting process using orthogonal modulation. These shortcomings are caused from inaccuracies of analog circuits such as 90 degree shifting of a local oscillator (LO) signal and mismatching of mixers and filters. The impossibility of perfect balance results in a mismatch between the I and Q signals transmitted. This results in a degradation of EVM due to the TX IQ mismatch.

Prior art IQ calibration techniques exists to combat the IQ mismatch problem. These prior art techniques, however, all use open loop correction techniques to extract the phase and magnitude using a power detector. Other prior art techniques operate on the receive side and not at the transmitter. Disadvantages of these systems include (1) sensitivity of the IQ calibration process to the LO leakage level; (2) sensitivity of the IQ calibration process to the noise present in the system; (3) the use of approximations to avoid complex calculations result in significantly reduced accuracies.

SUMMARY OF THE INVENTION

The present invention is a novel and useful apparatus for and method of closed loop IQ calibration for use in a transmitter. The IQ calibration mechanism of the present invention functions to provide IQ imbalance calibration in the presence of real world RF impairments. In contrast to the prior art open loop calibration mechanisms, the IQ calibration mechanism of the present invention uses an iterative process to update the gain and phase mismatch values whereby the metrics are calculated in a differential manner without the need for absolute imbalance values. At each iteration of the mechanism, only the direction of the correction to the gain and phase mismatch is required to perform the update. The direction of the correction is calculated using only the differences between output power measurements.

In operation, a plurality of calibration signals are transmitted (i.e. $P_1$-$P_4$) and measured at the output of the transmitter by a power detector. The gain and phase mismatch are estimated using only the differences between pairs of output power measurements. The updated gain and phase mismatch estimates are used to update an IQ correction matrix. This process is repeated until a desired stopping criterion is reached. In addition, gear shifting is used to ensure quick convergence of the algorithm while providing the ability to achieve any desired level of accuracy.

The IQ calibration mechanism of the invention provides several advantages, including: (1) the mechanism itself is relatively simple to implement requiring only addition and multiplication (shifting if multiplication limited to power of two numbers; (2) the mechanism it not computationally complex, as it does not require sine, cosine, square root or division operations; (3) the mechanism provides improved immunity to local oscillator (LO) leakage since it is cancelled out; (4) the mechanism provides improved immunity to poor signal to noise ratio (SNR) environments; and (5) the mechanism provides improved immunity to poor power detector accuracy due to the iterative nature of the mechanism.

Although the mechanism of the present invention can be used in numerous types of communication systems, to aid in illustrating the principles of the present invention, the description of the IQ calibration mechanism is provided in the context of a transmitter operative to conform to any suitable wireless specification such as UWB, WLAN, Bluetooth, or any other IQ transmitter based communication device such as a cellular phone, multimedia player, PDA, etc. It is appreciated, however, that the invention is not limited to the example applications presented, whereas one skilled in the art can apply the principles of the invention to other communication systems as well without departing from the scope of the invention.

Note that some aspects of the invention described herein may be constructed as software objects that are executed in embedded devices as firmware, software objects that are executed as part of a software application on either an embedded or non-embedded computer system such as a digital signal processor (DSP), microcomputer, minicomputer, microprocessor, etc. running a real-time operating system such as WinCE, Symbian, OSE, Embedded LINUX, etc. or non-real time operating system such as Windows, UNIX, LINUX, etc., or as soft core realized HDL circuits embodied in an Application Specific Integrated Circuit (ASIC) or Field Programmable Gate Array (FPGA), or as functionally equivalent discrete hardware components.

There is thus provided in accordance with the invention, a method of IQ calibration for use in a radio frequency (RF) transmitter, the method comprising the steps of transmitting a plurality of calibration signals and detecting the corresponding power output to generate a plurality of power detection signals thereby, estimating a gain mismatch and a phase mismatch based on differences of the plurality of power detection signals, updating an IQ correction matrix based on the gain mismatch estimate and the phase mismatch estimate and repeating the steps of transmitting, detecting, estimating and updating until a desired convergence is reached.

There is also provided in accordance with the invention, a method of IQ calibration for use in a radio frequency (RF) transmitter, the method comprising the steps of transmitting a plurality of calibration signals and measuring the corresponding power output to generate a plurality of power measurement signals thereby, first determining a first direction of correction for a gain mismatch estimate as a function of a first difference of the power measurement signals and generating an updated gain mismatch estimate therefrom, second determining a second direction of correction for a phase mismatch estimate as a function of a second difference of the power measurement signals and generating an updated phase mismatch estimate therefrom, updating an IQ correction matrix in accordance with the updated gain mismatch estimate and the updated phase mismatch estimate and repeating the steps of transmitting, first determining, second determining, and updating until a stopping criterion is reached.

There is further provided in accordance with the invention, an apparatus for IQ calibration for use in a radio frequency (RF) transmitter comprising a calibration signal module operative to transmit a plurality of calibration signals, a power detector operative to detect the power at the output of the transmitter in response to the calibration signals and to generate a plurality of power detection signals thereby, a correction matrix module operative to update a gain mismatch estimate and a phase mismatch estimate in accordance with differences between the power detection signals and iteratively update an IQ correction matrix in accordance with updated gain and phase mismatch estimates.

There is also provided in accordance with the invention, a radio frequency (RF) transmitter comprising a digital baseband operative to generate a digital baseband signal, digital to analog converter operative to convert the digital baseband signal to an analog baseband signal, an upconverter operative to translate the analog baseband signal to a higher transmit frequency, a power amplifier operative to amplify the upconverted signal for transmission over an RF channel, a power detector operative to measure the power output of the power amplifier and the digital baseband comprising an IQ calibration module operative to transmit a plurality of calibration signals, generate a plurality of power detection signals in response to the power output of the power amplifier in response to the calibration signals, update a gain mismatch estimate and a phase mismatch estimate in accordance with differences between the power detection signals and iteratively update an IQ correction matrix in accordance with updated gain and phase mismatch estimates.

There is further provided in accordance with the invention, a communications device comprising at least one radio comprising a transmitter, the transmitter comprising an IP calibration module, the IP calibration module comprising a calibration signal module operative to transmit a plurality of calibration signals, a power detector operative to detect the power at the output of the transmitter in response to the calibration signals and to generate a plurality of power detection signals thereby, a correction matrix module operative to update a gain mismatch estimate and a phase mismatch estimate in accordance with differences between the power detection signals and iteratively update an IQ correction matrix in accordance with updated gain and phase mismatch estimates.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
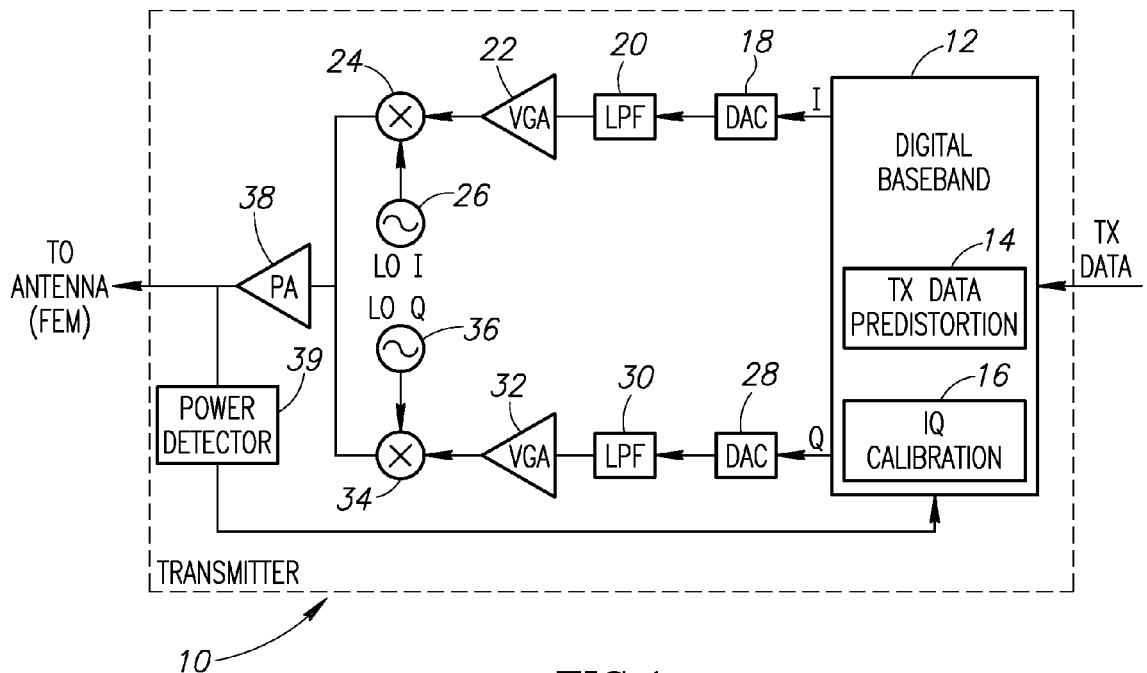
FIG. 1 is a block diagram illustrating an example transmitter incorporating the IQ calibration mechanism of the present invention.

The following notation is used throughout this document.

| Term | Definition |
| --- | --- |
| AC | Alternating Current |
| ADC | Analog to Digital Converter |
| ASIC | Application Specific Integrated Circuit |
| AVI | Audio Video Interleave |
| BB | Baseband |
| BMP | Windows Bitmap |
| CDMA | Code Division Multiple Access |
| CE | Consumer Electronics |
| CPU | Central Processing Unit |
| DAC | Digital to Analog Converter |
| DBB | Digital Baseband |
| DC | Direct Current |
| DSP | Digital Signal Processor |
| DVD | Basic Service Set |
| EDGE | Enhanced Data Rates for GSM Evolution |
| EEPROM | Electrically Erasable Programmable Read Only Memory |
| EPROM | Erasable Programmable Read Only Memory |
| EVM | Error Vector Magnitude |
| FCC | Federal Communications Commission |
| FDM | Frequency Division Multiplex |
| FM | Frequency Modulation |
| FPGA | Field Programmable Gate Array |
| GPRS | General Packet Radio Service |
| GPS | Ground Positioning Satellite |
| HDL | Hardware Description Language |
| HDTV | High Definition Television |
| IBSS | Independent Basic Service Set |
| ICI | Inter-Carrier Interference |
| IEEE | Institute of Electrical and Electronics Engineers |
| IF | Intermediate Frequency |
| ITU | International Telecommunication Union |
| JPG | Joint Photographic Experts Group |
| LAN | Local Area Network |
| LO | Local Oscillator |
| LPF | Low Pass Filter |
| MBOA | Multiband OFDM Alliance |
| MP3 | MPEG-1 Audio Layer 3 |
| MPG | Moving Picture Experts Group |
| NIC | Network Interface Card |
| OFDM | Orthogonal Frequency Division Multiplexing |
| PA | Power Amplifier |
| PAN | Personal Area Network |
| PC | Personal Computer |
| PCB | Printed Circuit Board |
| PCI | Personal Computer Interconnect |
| PDA | Portable Digital Assistant |
| PVR | Personal Video Recorder |
| RAM | Random Access Memory |
| RAT | Radio Access Technology |
| RF | Radio Frequency |
| RFIC | Radio Frequency Integrated Circuit |
| RMS | Root Mean Squared |
| ROM | Read Only Memory |
| SDIO | Secure Digital Input Output |
| SIM | Subscriber Identity Module |
| SNR | Signal to Noise Ratio |
| SPI | Serial Peripheral Interconnect |
| STA | Station |
| TPC | Transmit Power Control |
| TV | Television |

-continued

| Term | Definition |
|---|---|
| USB | Universal Serial Bus |
| UWB | Ultra Wideband |
| WiFi | Wireless Fidelity |
| WiMax | Worldwide Interoperability for Microwave Access |
| WiMedia | Radio platform for UWB |
| WLAN | Wireless Local Area Network |
| WMA | Windows Media Audio |
| WMV | Windows Media Video |
| WPAN | Wireless Personal Area Network |

Detailed Description of the Invention

The present invention is a novel and useful apparatus for and method of closed loop IQ calibration for use in a transmitter. The IQ calibration mechanism of the present invention functions to provide IQ imbalance calibration in the presence of real world RF impairments. In contrast to the prior art open loop calibration mechanisms, the IQ calibration mechanism of the present invention uses an iterative process to update the gain and phase mismatch values whereby the metrics are calculated in a differential manner without the need for absolute imbalance values. At each iteration of the mechanism, only the direction of the correction to the gain and phase mismatch is required to perform the update. The direction of the correction is calculated using only the differences between output power measurements.

Although the mechanism of the present invention can be used in numerous types of communication systems, to aid in illustrating the principles of the present invention, the description of the IQ calibration mechanism is provided in the context of a transmitter operative to conform to any suitable wireless specification such as UWB, WLAN, Bluetooth, or any other IQ transmitter based communication device such as a cellular phone, multimedia player, PDA, etc. It is appreciated, however, that the invention is not limited to the example applications presented, whereas one skilled in the art can apply the principles of the invention to other communication systems as well without departing from the scope of the invention.

Note that throughout this document, the term communications device is defined as any apparatus or mechanism adapted to transmit, receive or transmit and receive data through a medium. The term communications transceiver or communications device is defined as any apparatus or mechanism adapted to transmit and receive data through a medium. The communications device or communications transceiver may be adapted to communicate over any suitable medium, including wireless or wired media. Examples of wireless media include RF, infrared, optical, microwave, UWB, Bluetooth, WiMAX, WiMedia, WiFi, or any other broadband medium, etc. Examples of wired media include twisted pair, coaxial, optical fiber, any wired interface (e.g., USB, Firewire, Ethernet, etc.). The term Ethernet network is defined as a network compatible with any of the IEEE 802.3 Ethernet standards, including but not limited to 10 Base-T, 100 Base-T or 1000 Base-T over shielded or unshielded twisted pair wiring. The terms communications channel, link and cable are used interchangeably.

The term multimedia player or device is defined as any apparatus having a display screen and user input means that is capable of playing audio (e.g., MP3, WMA, etc.), video (AVI, MPG, WMV, etc.) and/or pictures (JPG, BMP, etc.). The user input means is typically formed of one or more manually operated switches, buttons, wheels or other user input means. Examples of multimedia devices include pocket sized personal digital assistants (PDAs), personal media player/recorders, cellular telephones, handheld devices, and the like.

Some portions of the detailed descriptions which follow are presented in terms of procedures, logic blocks, processing, steps, and other symbolic representations of operations on data bits within a computer memory. These descriptions and representations are the means used by those skilled in the data processing arts to most effectively convey the substance of their work to others skilled in the art. A procedure, logic block, process, etc., is generally conceived to be a self-consistent sequence of steps or instructions leading to a desired result. The steps require physical manipulations of physical quantities. Usually, though not necessarily, these quantities take the form of electrical or magnetic signals capable of being stored, transferred, combined, compared and otherwise manipulated in a computer system. It has proven convenient at times, principally for reasons of common usage, to refer to these signals as bits, bytes, words, values, elements, symbols, characters, terms, numbers, or the like.

It should be born in mind that all of the above and similar terms are to be associated with the appropriate physical quantities they represent and are merely convenient labels applied to these quantities. Unless specifically stated otherwise as apparent from the following discussions, it is appreciated that throughout the present invention, discussions utilizing terms such as 'processing,' 'computing,' 'calculating,' 'determining,' 'displaying' or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention can take the form of an entirely hardware embodiment, an entirely software embodiment or an embodiment containing a combination of hardware and software elements. In one embodiment, a portion of the mechanism of the invention is implemented in software, which includes but is not limited to firmware, resident software, object code, assembly code, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium is any apparatus that can contain, store, communicate, propagate, or transport the program for use by or in connection with the instruction execution system, apparatus, or device, e.g., floppy disks, removable hard drives, computer files comprising source code or object code, flash semiconductor memory (USB flash drives, etc.), ROM, EPROM, or other semiconductor memory devices.

Example Transmitter and Power Detection

A block diagram illustrating an example transmitter incorporating the IQ calibration mechanism of the present invention is shown in FIG. 1. The transmitter, generally referenced 10, comprises a digital baseband (DBB) 12, an I path including: digital to analog converter (DAC) 18, low pass filter (LPF) 20, variable gain amplifier (VGA) 22, mixer 24 and $LO_I$ 26; a Q path including: DAC 28, LPF 30, VGA 32, mixer 34 and $LO_Q$ 36; a power amplifier (PA) 38 and power detector

39. The digital baseband 12 comprises a TX data predistortion block 14 and IQ calibration block 16.

In operation, the output (both I and Q signal outputs) of the digital IQ modulator (i.e. the digital baseband) is converted to an analog signal by the high rate DAC. The low pass filter (LPF) following the DAC attenuates all spectrum replicas created by the DAC. To allow flexibility in the Transmit Power Control (TPC) algorithm, the baseband (BB) part of the TX chain comprises a variable gain amplifier (VGA). The output of the VGA is upconverted to an RF frequency by a mixer. Note that in the case of UWB, the RF frequency may be one out of three center frequencies, including 3432, 3960 and 4488 MHz. Once in the RF domain, the signal is amplified by the power amplifier (PA). A power detector (i.e. coupler) at the output of the power amplifier "samples" part of the PA output to provide a power indication. The power detection mechanism is described in more detail infra.

Figure 2:
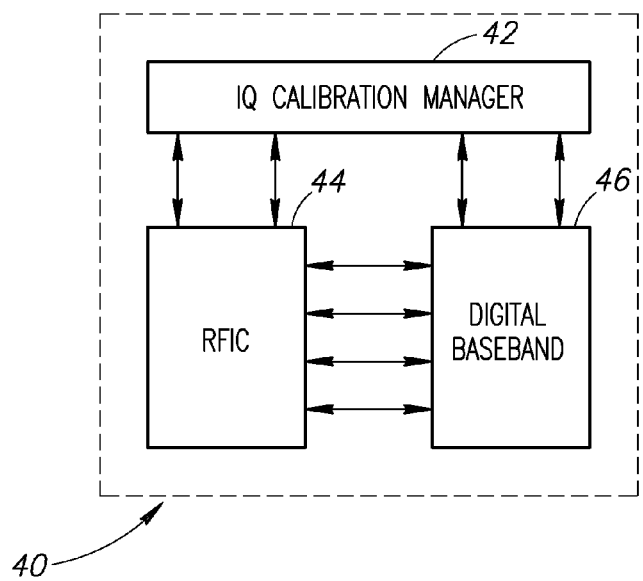
FIG. 2 is a block diagram illustrating the IQ calibration manager of the present invention in an example transmitter.

A block diagram illustrating the IQ calibration manager of the present invention in an example transmitter is shown in FIG. 2. The radio block, generally referenced 40, comprises a digital baseband (DBB) block 46, RFIC block 44 and an IQ calibration manager 42. The IQ calibration manger in this example is a software based calibration manger that controls the digital baseband as well as the RFIC block. It configures both blocks appropriately for each of the calibration phases described infra, provides timing of all calibration phases and operations and performs the calibration using dedicated hardware assist blocks adapted for use with the calibration process.

Figure 3:
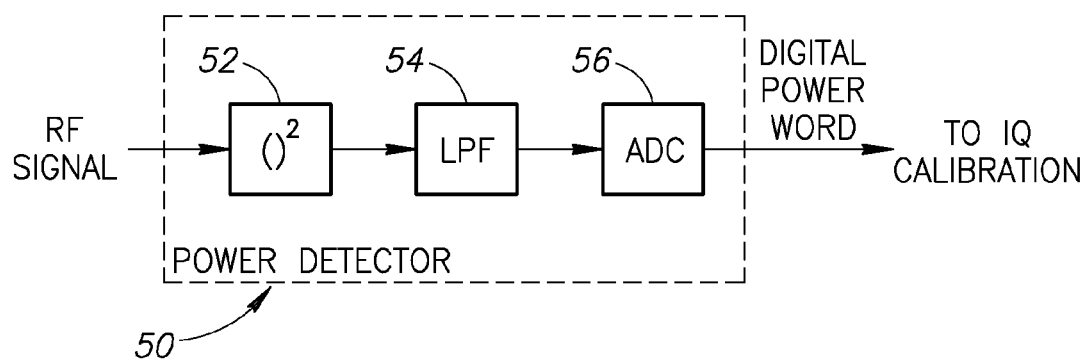
FIG. 3 is a block diagram illustrating an example power detector portion of the IQ calibration mechanism of the present invention.

A block diagram illustrating an example power detector portion of the IQ calibration mechanism of the present invention is shown in FIG. 3. The power detector block, generally referenced 50, comprises a squarer block 52, low pass filter block 54 and analog to digital converter (ADC) block 56. The power detector block 50 effectively represents a model that can be used for the TX power detector.

The power detector functions to sample part of the output of the power amplifier and provides an indication of what the output power is. The power detector provides an analog signal which is filtered and sampled with an ADC to obtain a digital word that corresponds to the power level.

In operation, power detection, at the output of the PA, is achieved using a diode which can be approximated as a square law operation. The LPF functions to filter out the second harmonic signal generated by the diode. The resulting analog signal is sampled by an ADC to generate a digital power word which is read and used by the calibration manager to perform IQ calibration of the transmitter.

General TX IQ Correction

The IQ calibration mechanism of the present invention is operative to estimate the gain and phase mismatch or imbalance between the I and Q paths in the transmitter. Typically, gain mismatch is introduced in the local filtering and variable gain amplifier sections of the TX. The phase mismatch is typically introduced in the mixing section of the TX. Once the gain and phase imbalances are estimated, a correction is applied. If we denote M as the matrix that applies the imbalance and $\hat{M}$ as the same matrix with the gain and phase imbalance that are estimated by the mechanism, than $\hat{M}$ is given by:

$$\hat{M} = \begin{bmatrix} \hat{\alpha} & 0 \\ \sin(\hat{\varphi}) & \cos(\hat{\varphi}) \end{bmatrix} \quad (1)$$

where $\alpha$ represents the gain mismatch and $\varphi$ represents the phase mismatch. To apply the correction, the inverse of matrix $\hat{M}$ is calculated as follows:

$$\hat{M}^{-1} = \begin{bmatrix} \hat{\alpha} & 0 \\ \sin(\hat{\varphi}) & \cos(\hat{\varphi}) \end{bmatrix}^{-1} \quad (2)$$

$$= \frac{1}{\hat{\alpha} \cdot \cos(\hat{\varphi})} \cdot \begin{bmatrix} \cos(\hat{\varphi}) & 0 \\ -\sin(\hat{\varphi}) & \hat{\alpha} \end{bmatrix}$$

$$= \frac{1}{\hat{\alpha}} \cdot \begin{bmatrix} 1 & 0 \\ -\tan(\hat{\varphi}) & \frac{\hat{\alpha}}{\cos(\hat{\varphi})} \end{bmatrix}$$

Applying a Taylor series approximation to Equation 2 yields the following:

$$\hat{M}^{-1} \cong \frac{1}{\hat{\alpha}} \cdot \begin{bmatrix} 1 & 0 \\ -\hat{\varphi} & \hat{\alpha} \cdot \left(1 - \frac{\hat{\varphi}^2}{2}\right) \end{bmatrix} \quad (3)$$

It is noted that during the correction phase only very simple mathematical calculations are performed without the requirement for any square root or division operations. During the correction phase, the data to be transmitted is pre-distorted with the inverse of matrix $\hat{M}$ (Equation 3) before being output of the digital baseband.

Figure 4:
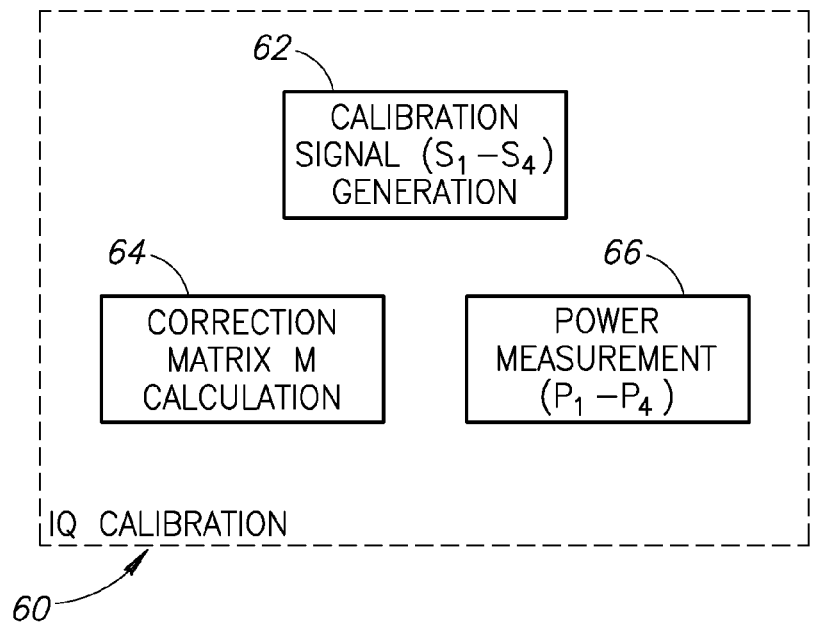
FIG. 4 is a block diagram illustrating the IQ calibration module of the invention in more detail.

A block diagram illustrating the IQ calibration module of the invention in more detail is shown in FIG. 4. The IQ calibration block, generally referenced 60, comprises a calibration signal generation block 62, power measurement block 66 and correction matrix M calculation block 64. These processing blocks may be implemented as hardware, software or a combination thereof depending on the particular implementation.

The calibration signal generation block functions to inject specific signals into the trasmitter which are used to estimate the IQ imbalance. The power detection block functions to measure and generate samples of the output power for use in the estimation process. The IQ corection matrix calculation block functions to generate gain and phase mismatch estimates and to use these estimates to update the IQ correction matrix. The operation of each of these blocks is described in more detail infra.

IQ Calibration—Method 1

The first method implements a feed-forward scheme whereby a complex baseband signal is transmitted that passes through the correction matrix M (a 2×2 matrix) and than through the IQ mismatch block. A mathematical description is given below:

$$s\_RF(t) = \begin{bmatrix} \alpha_{TX} & 0 \\ \sin(\varphi_{TX}) & \cos(\varphi_{TX}) \end{bmatrix} \cdot \begin{bmatrix} M_{II} & M_{IQ} \\ M_{QI} & M_{QQ} \end{bmatrix} \cdot x(t) \quad (4)$$

Note that the first matrix after the equal sign (i.e. the IQ mismatch) represents the IQ imbalance that is applied to the transmitted signal by the transmitter and represents the various sources of IQ imbalance inherent in the transmission path. It is this entity that the mechanism attempts to compensate for. The M matrix is the entity the mechanism of the invention is operative to determine. Predistorting the transmit data with this matrix effectively compensate against the IQ imbalance introduced by the transmitter. Ideally, the M matrix is exactly the inverse of the IQ mismatch matrix thereby effectively canceling it out resulting in a clean transmit signal at the output of the transmitter.

During calibration the same signal is transmitted, $x(t)=\exp(j2\pi ft)$ but the four matrix terms change in accordance with the values listed in Table 1 below:

TABLE 1

Matrix Elements for Each Transmitted Signal

| Calibration Signal | $M_{II}$ | $M_{IQ}$ | $M_{QI}$ | $M_{QQ}$ | Power |
|---|---|---|---|---|---|
| $S_1$ | 1 | 0 | 0 | 0 | $P_1 = a_{TX}^2 + \sin^2(\phi_{TX})$ |
| $S_2$ | 0 | 0 | 0 | 1 | $P_2 = \cos^2(\phi_{TX})$ |
| $S_3$ | 1 | 0 | 1 | 0 | $P_3 = a_{TX}^2 + (\sin(\phi_{TX}) + \cos(\phi_{TX}))^2$ |
| $S_4$ | 0 | 1 | 0 | -1 | $P_4 = a_{TX}^2 + (\sin(\phi_{TX}) - \cos(\phi_{TX}))^2$ |

Substituting the matrix terms that correspond to $S_1$, for example, in Equation 4 yields:

$$S1\_RF(t) = \begin{bmatrix} a_{TX} & 0 \\ \sin(\varphi_{TX}) & \cos(\varphi_{TX}) \end{bmatrix} \begin{bmatrix} 1 & 0 \\ 0 & 0 \end{bmatrix} \begin{bmatrix} \text{Re}\{x(t)\} \\ \text{Im}\{x(t)\} \end{bmatrix} \quad (5)$$

$$= \begin{bmatrix} a_{TX} \cdot \text{Re}\{x(t)\} \\ \sin(\varphi_{TX}) \cdot \text{Im}\{x(t)\} \end{bmatrix}$$

where $\alpha$ represents the gain mismatch, $\phi$ represents the phase mismatch and $x(t)$ represents the transmitted data.

The power can now be easily calculated to yield $P_1 = \alpha_{TX}^2 + \sin^2(\phi_{TX})$. The substitution and calculation for $S_1$ is repeated for $S_2$ to $S_4$ and listed in the rightmost column in Table 1 above.

The gain mismatch is extracted using the following calculation:

$$\tilde{a}_{TX} = \sqrt{\frac{P_1}{P_2}} \quad (6)$$

$$= \sqrt{\frac{a_{TX}^2 + \sin^2(\varphi_{TX})}{\cos^2(\varphi_{TX})}}$$

$$\cong a_{TX}$$

The phase mismatch is extracted using the following calculation:

$$\tilde{\varphi}_{TX} = \frac{\left(1 + \frac{P_1}{P_2}\right)}{\sqrt{\frac{P_1}{P_2}}} \cdot \frac{(P_3 - P_4)}{(P_3 + P_4)} \quad (7)$$

$$= \frac{\frac{a_{TX}^2 + 1}{\cos^2(\varphi_{TX})}}{\sqrt{\frac{a_{TX}^2 + \sin^2(\varphi_{TX})}{\cos^2(\varphi_{TX})}}} \cdot \frac{a_{TX} \cdot \sin(2\varphi_{TX})}{2(a_{TX}^2 + 1)}$$

$$= \frac{\sin(2\varphi_{TX})}{2} \cdot \frac{a_{TX}}{\sqrt{a_{TX}^2 + \sin^2(\varphi_{TX})}} \cdot \frac{1}{\cos(\varphi_{TX})}$$

where $P_1$ through $P_4$ are given in Table 1 above. Assuming the phase mismatch is sufficient Equation 7 can be simplified to:

$$\tilde{\varphi}_{TX} = \frac{\sin(2\varphi_{TX})}{2} \cdot \frac{a_{TX}}{\sqrt{a_{TX}^2 + \sin^2(\varphi_{TX})}} \cdot \frac{1}{\cos(\varphi_{TX})} \quad (8)$$

$$\cong \frac{\sin(2\varphi_{TX})}{2}$$

$$\cong \varphi_{TX}$$

Figure 5:
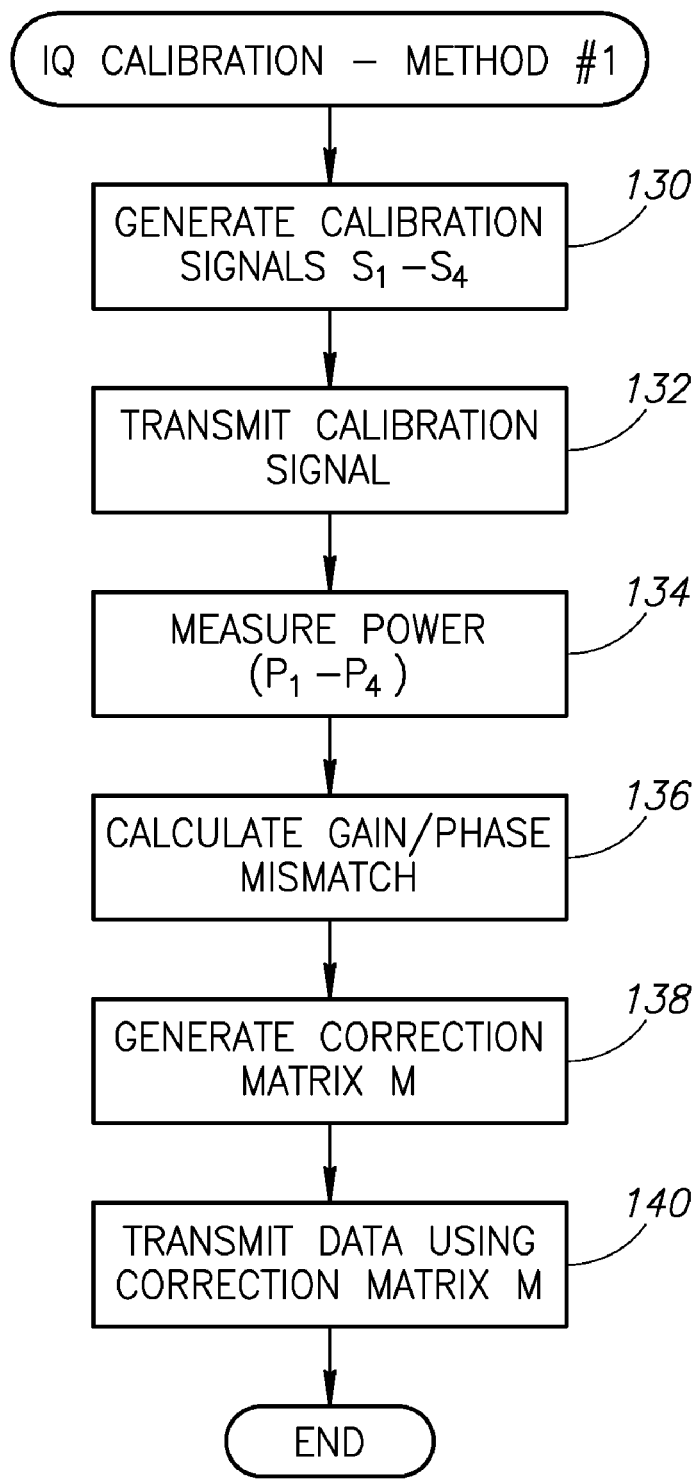
FIG. 5 is a flow diagram illustrating a first IQ calibration method of the present invention.

A flow diagram illustrating a first IQ calibration method of the present invention is shown in FIG. 5. First, the calibration signals $S_1$ to $S_4$ are generated using initial values of the gain and phase mismatch (step 130). The calibration signals are then transmitted one by one (step 132). For each calibration signal transmitted, $S_1$ to $S_4$, the power at the output of the power amplifier 38 (FIG. 1) is measured by the power detector 39, to generate $P_1$ to $P_4$, repsectively (step 134).

Using the power measurement signals $P_1$ to $P_4$, the gain and phase mismatch estimates are calculated using Equations 6 and 7 (step 136). Based on the gain and phase mismatch estiamtes, the correction matrix M is calculated using Equation 3 (step 138). The transmit data is then predistorted using the correction matrix M to compensate for the IQ imbalance (step 140).

Figure 6:
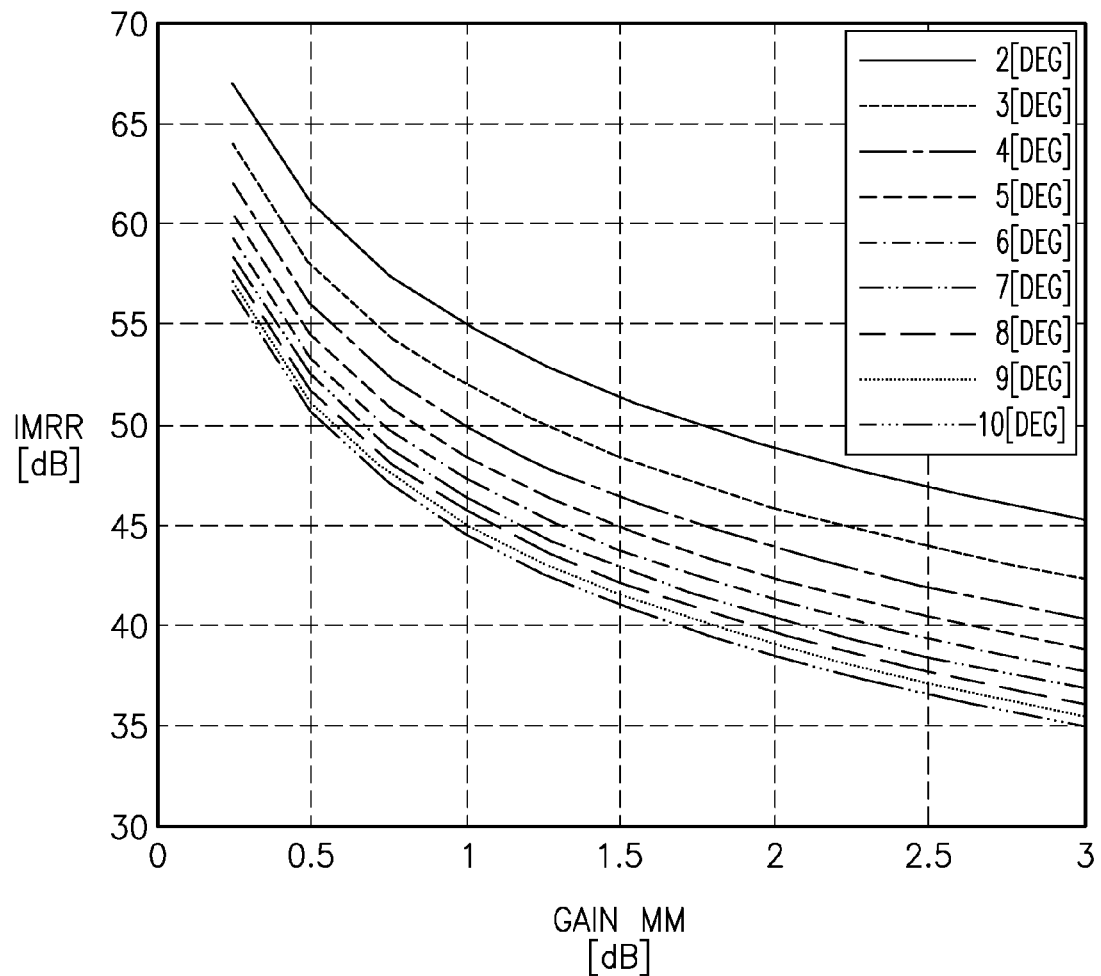
FIG. 6 is a graph illustrating the image rejection ratio as a function of gain mismatch for several values of phase mismatch.

Considering the approximations taken in Equations 6 and 7, it is evident that the ability to fully calibrate the IQ gain and phase mismatch is limited depending on the initial values of the gain and phase mismatches. To illustrate this, a simulation graph illustrating the image rejection ratio (IMRR) as a function of gain mismatch for several values of phase mismatch is shown in FIG. 6. The graph depicts the upper bound of the image rejection ratio (expressed in dB) as a function of gain mismatch and phase mismatch values ranging from 2 to 10 degrees.

The initial gain and phase mismatch are scanned and using an optimal feed-forward (i.e. open loop) detector, the gain and phase mismatch are estimated. The residual gain and phase mismatch are calculated, and from this data the image rejection ratio (IMRR) is extracted and shown in FIG. 6. Note that an IMRR floor of 35 dB exists for an initial IMRR of 14.3 dB (i.e. an initial gain mismatch of 3 dB in combination with an initial phase mismatch of 10 degrees).

The approximation of gain and phase mismatch is accurate only if the initial gain and phase mismatch are relatively small. If the initial gain and phase mismatch are relatively large (e.g., 3 dB of gain mismatch and 10 degrees of phase mismatch), the open loop method (FIG. 5) is not very robust. On top of this inherent floor (due to the initial uncorrected gain and phase mismatch), the effect of sampling noise, thermal noise, power detector impairments, LO leakage impairments, etc. degrades the performance even more.

The feed-forward scheme described supra, however, suffers from several impairments, as described below. In addition to the above drawback, the feed-forward scheme is more sensitive to impairments such as LO leakage, etc. discussed below.

Regarding LO leakage in the open loop case, the presence of LO leakage biases all power detection measurements. Since the calculation of gain and phase mismatch and updating of the correction matrix are based on actual absolute results (as opposed to differential calculations) this biases the results and eventually limits the ability to correct the IQ mismatch.

Regarding the accuracy of the power detector, a relatively large uncorrected IQ mismatch (e.g., gain mismatch is approximately 2 dB) will results in a relatively large difference in the power readings of each of the four power measurements ($P_1$ to $P_4$). The power detector curve can be approximated to a square-law line but as the range of power levels captured widens this $2^{nd}$ order model becomes less and less accurate.

Noise is impairment, which may be quantization noise, jitter, power detector sampling noise, thermal noise, etc. Due to each operation being performed only once, the final result can easily be biased resulting in a degradation of accuracy if an error in one of the measurements were to occur.

Note that of the three impairments described above, the LO leakage impairment is the most problematic since it can significantly bias the results. Due to the fact that the RFIC section of the transmitter 44 (FIG. 2) is configured the same for all four calibration signals, the same LO leakage is expected (in terms of magnitude and phase). Thus, instead of having just the required signal to be transmitted, there is an additional constant interferer that biases all four power measurements.

IQ Calibration—Method 2

A second IQ calibration scheme is provided which is a closed loop based scheme as opposed to the open loop scheme of method 1 described supra. In general, in the second IQ calibration method, four different calibration signals are transmitted and their output power measurements are taken. Rather than attempt to determine the absolute gain and phase mismatch, however, only the trend needs to be determined. The trend for both gain and phase mismatch is determined by taking the difference between pairs of power measurements. The differences are used to update the mismatch estimates in an iterative process, i.e. a closed loop process or feedback scheme. The iteration stops when a predetermined stopping criterion is reached. To speed the process without sacrificing accuracy, gear shifting is used.

The feedback (i.e. closed loop) IQ calibration scheme will now be described in more detail. Consider a real single transmit signal x(t). To simplify calculations x(t) is expressed as $$x(t) = \sqrt{2} \cdot \sin(2\pi f t) \quad (9)$$

From this x(t) signal the following four signals listed below in Table 2 are generated:

TABLE 2

TX IQ Mismatch Correction (Calibration) Signals

| Signal | Real Coefficient | Image Coefficient | Total |
|---|---|---|---|
| $S_1$ | 1 | 0 | $s_1(t) = x(t)$ |
| $S_2$ | 0 | 1 | $s_2(t) = jx(t)$ |
| $S_3$ | $\frac{1}{\sqrt{2}}$ | $\frac{1}{\sqrt{2}}$ | $s_3(t) = \frac{1}{\sqrt{2}}(x(t) + jx(t))$ |
| $S_4$ | $\frac{1}{\sqrt{2}}$ | $-\frac{1}{\sqrt{2}}$ | $s_3(t) = \frac{1}{\sqrt{2}}(x(t) - jx(t))$ |

Each of these four S signals (i.e. calibration signals) is transmitted sequentially. For each signal a reading is obtained from the power detector. Thus, the sequential transmission of the four calibration signals $S_1, S_2, S_3, S_4$ results in four power measurement signals denoted $P_1, P_2, P_3, P_4$ respectively (i.e. $P_1$ is the output power reading when $S_1$ is transmitted, etc.).

Using the first calibration signal $S_1$ as an example, the power detector measurement signal $P_1$ is given by:

$$P_1 = \tilde{I}^2 + \tilde{Q}^2 \quad (10)$$

where $\tilde{I}, \tilde{Q}$ are given by:

$$\begin{bmatrix} \tilde{I} \\ \tilde{Q} \end{bmatrix} = \begin{bmatrix} a_{TX} & 0 \\ \sin(\varphi_{TX}) & \cos(\varphi_{TX}) \end{bmatrix} \cdot \hat{M}^{-1} \cdot s(t) \quad (11)$$

$$= \begin{bmatrix} a \cdot x(t) \\ 0 \end{bmatrix}$$

where the first matrix after the equal sign represents the impairment to be compensated for, $\alpha$ represents the gain mismatch, $\phi$ represents the phase mismatch and the initial values for $\hat{M}^{-1}$ are $$\begin{bmatrix} 1 & 0 \\ 0 & 1 \end{bmatrix}$$

(i.e. no gain or phase mismatch).

Thus from Equations 10 and 11, the first power measurement signal $P_1$ is equal to $\alpha^2$. The procedure performed above for $S_1$ can be repeated with the three other calibration signals $S_2$ to $S_4$ to yield the following results:

TABLE 3

Calibration Signal Versus Power (before correction)

| Signal | Power |
|---|---|
| $S_1$ | $P_1 = a^2$ |
| $S_2$ | $P_2 = 1$ |
| $S_3$ | $P_3 = \frac{1}{2}(a^2 + 1 + \sin(2\phi))$ |
| $S_4$ | $P_4 = \frac{1}{2}(a^2 + 1 - \sin(2\phi))$ |

A key difference between the closed loop method and the open loop described supra is that the closed loop method neither calculates the gain nor the phase mismatch. In contrast, only the trend (i.e. the direction) of how the mismatches should be corrected is updated. This update of the trend of the direction in which the mismatch is going is repeated after the IQ correction coefficients are updated.

The gain mismatch estimate is updated according to the following expression:

$$\tilde{a}_{TX}(n) = \tilde{a}_{TX}(n-1) + \alpha \cdot \text{sign}(P_1 - P_2) \quad (12)$$

The phase mismatch estimate is updated according to the following expression:

$$\hat{\varphi}_{TX}(n) = \hat{\varphi}_{TX}(n-1) + \beta \cdot \text{sign}(P_3 - P_4) \quad (13)$$

where $\alpha$ and $\beta$ are correction factor coefficients used to implement optional gear shifting wherein larger values of $\alpha$ and $\beta$ are used initially to quickly achieve convergence followed by use of smaller values of $\alpha$ and $\beta$ to achieve the desired accuracy. The values $\alpha$ and $\beta$ can be set to achieve any desired accuracy and to implement gear shifting depending on the particular implementation of the invention.

It is noted that the expressions for the gain and phase mismatch estimate updates do not require any complex computations. Only simple addition, subtraction and shift operations are required (assuming power of two multiplications), thus significantly reducing the computation resources and time required to implement the IQ mismatch calibration mechanism of the invention.

Once the gain and phase mismatch estimates are updated, the correction matrix is updated as follows $$\hat{M}^{-1}(n) \cong \frac{1}{\hat{a}(n)} \cdot \begin{bmatrix} 1 & 0 \\ -\hat{\varphi}(n) & \hat{a}(n) \cdot \left(1 - \frac{\hat{\varphi}(n)^2}{2}\right) \end{bmatrix} \quad (14)$$

$$\hat{M}(n+1)^{-1} \cong \frac{1}{\hat{a}(n+1)} \cdot \begin{bmatrix} 1 & 0 \\ -\hat{\varphi}(n+1) & \hat{a}(n+1) \cdot \left(1 - \frac{\hat{\varphi}(n+1)^2}{2}\right) \end{bmatrix} \quad (15)$$

The new IQ correction matrix M is then applied to the new signal to be transmitted (as shown in Equation 11 above) and the whole process repeats itself in iterative fashion until a stopping criterion is reached.

Figure 7:
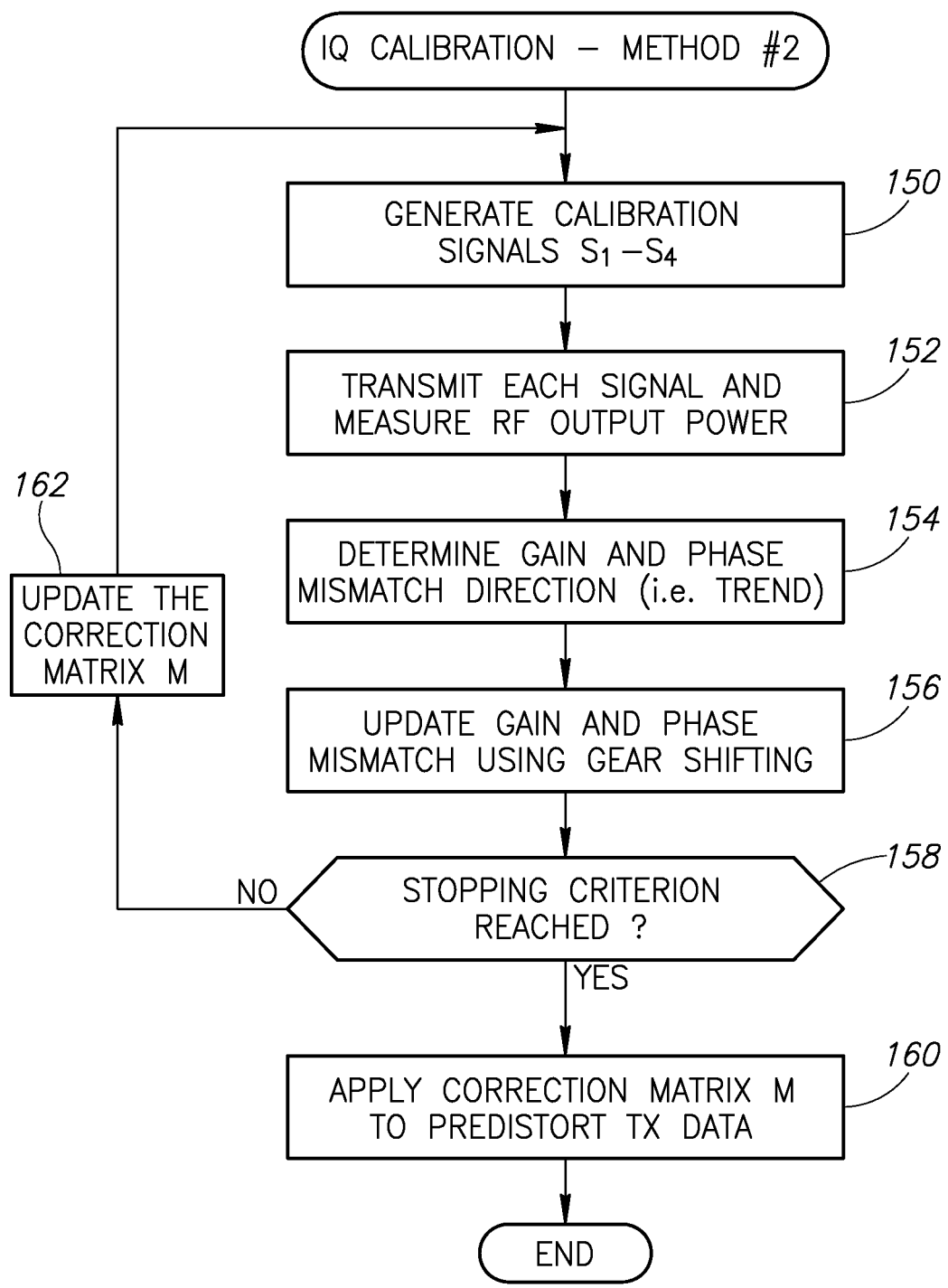
FIG. 7 is a diagram illustrating a second IQ calibration method of the present invention.

A diagram illustrating a second IQ calibration method of the present invention is shown in FIG. 7. First, the calibration signals $S_1$ to $S_4$ are generated in accordance with Table 2 (step 150). Each calibration signal is sequentially transmitted and the power detector measures the output power (step 152). The gain and phase mismatch direction (i.e. trend) is determined by calcluating the differences between the power measurements (step 154). The gain mismatch direction is determined as a function of the difrerence between $P_1$ and $P_2$. Similarly, the phase mismatch direction is determined as a function of the difrerence between $P_3$ and $P_4$.

Once the gain and phase mismatch directions are determined, the gain and phase mismatch estimates are updated (step 156). During this step, gear shifting can optionally be used to speed up convergence while maintaining a desired accuracy. If the stopping criterion has not yet been reached (e.g., specific accuracy, number of iterations, etc.) (step 158), the correction matrix M is updated (step 162) and the method repeats for another iteration. If the stopping criterion has been reached (typically under software control) (step 158), the correction matrix M is applied to predistort transmit data in the digital baseband section 12 (FIG. 1) (step 160).

To ensure the algorithm works properly, and not just for the initial state (i.e. when the correction matrix is a simple eye matrix of 2×2), it should be shown that when a correction is applied, the calculations for the gain and phase mismatch estimate updates result in an error that drives the algorithm in the correct direction (i.e. correct estimation of the actual gain and phase mismatch).

To show that convergence to the correct value will actually occur, the following model is used:

$$\begin{bmatrix} a_{TX} & 0 \\ \sin(\varphi_{TX}) & \cos(\varphi_{TX}) \end{bmatrix} \cdot \begin{bmatrix} \hat{a}_{TX} & 0 \\ \sin(\hat{\varphi}_{TX}) & \cos(\hat{\varphi}_{TX}) \end{bmatrix}^{-1} = \quad (16)$$

$$\begin{bmatrix} \frac{a_{TX}}{\hat{a}_{TX}} & 0 \\ \frac{\sin(\varphi_{TX}) - \cos(\varphi_{TX}) \cdot \tan(\hat{\varphi}_{TX})}{\hat{a}_{TX}} & \frac{\cos(\varphi_{TX})}{\cos(\hat{\varphi}_{TX})} \end{bmatrix}$$

Considering that the TX power detector output is equal to $P_{out} = E(I^2 + Q^2)$, the value of $P_1, P_2, P_3$ and $P_4$ easily be calculated as:

$$P_1 = \left(\frac{a_{TX}}{\hat{a}_{TX}}\right)^2 + \left(\frac{\sin(\varphi_{TX}) - \cos(\varphi_{TX})\tan(\hat{\varphi}_{TX})}{\hat{a}_{TX}}\right)^2 \quad (17)$$

$$P_2 = \left(\frac{\cos(\varphi_{TX})}{\cos(\hat{\varphi}_{TX})}\right)^2 \quad (18)$$

$$P_3 = \left(\frac{a_{TX}}{\hat{a}_{TX}}\right)^2 + \left(\frac{\sin(\varphi_{TX}) - \cos(\varphi_{TX})\tan(\hat{\varphi}_{TX})}{\hat{a}_{TX}} + \frac{\cos(\varphi_{TX})}{\cos(\hat{\varphi}_{TX})}\right)^2 \quad (19)$$

$$P_4 = \left(\frac{a_{TX}}{\hat{a}_{TX}}\right)^2 + \left(\frac{\sin(\varphi_{TX}) - \cos(\varphi_{TX})\tan(\hat{\varphi}_{TX})}{\hat{a}_{TX}} - \frac{\cos(\varphi_{TX})}{\cos(\hat{\varphi}_{TX})}\right)^2 \quad (20)$$

Figure 8:
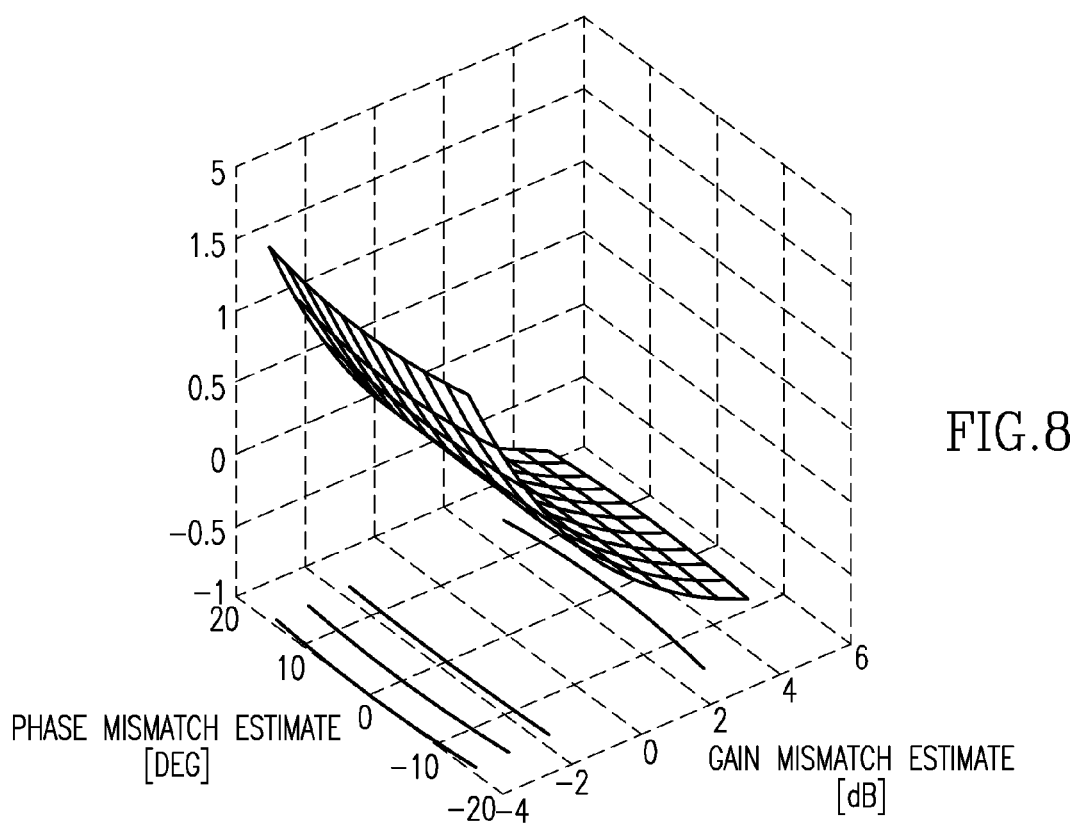
FIG. 8 is a graph illustrating the difference $P_1-P_2$ as a function of the gain and phase deviation from real values.

Due to the difficulty in showing analytically that the above set of equations for $P_1, P_2, P_3$ and $P_4$ converges for every possible gain and phase mismatch, a mathematical simulation was performed proving convergence is guaranteed. A graph illustrating the simulated results of the difference $P_1 - P_2$ as a function of the gain and phase deviation from real values is shown in FIG. 8. This graph shows that when the gain mismatch is estimated, the direction of the IQ correction is neither a function of the phase mismatch nor the phase mismatch estimation.

Figure 9:
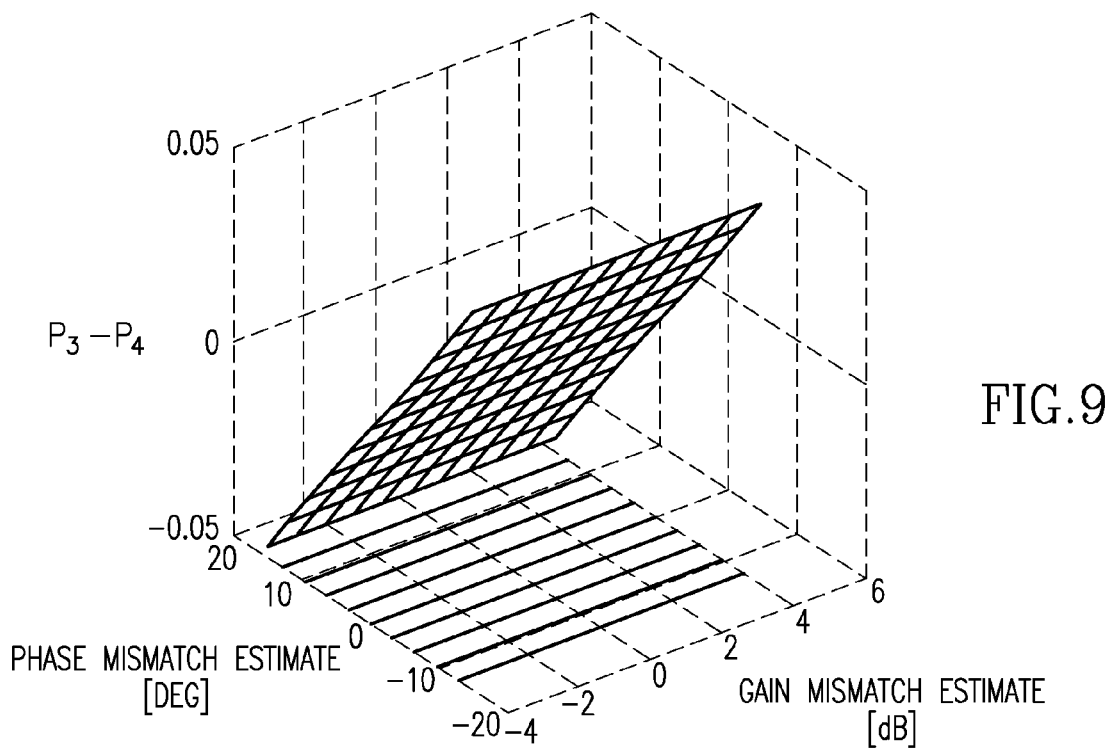
FIG. 9 is a graph illustrating the difference $P_3-P_4$ as a function of the gain and phase deviation from real values.

A graph illustrating the simulated results of the difference $P_3 - P_4$ as a function of the gain and phase deviation from real values is shown in FIG. 9. This graph is similar to that of FIG. 8, with the difference being that the phase mismatch is the parameter of interest in FIG. 9, rather than the gain mismatch. Further simulation results obtained by randomly selecting the initial values are presented infra.

The effects of several impairments on the second TX IQ estimation mechanism (method 2) will now be described. Regarding residual LO leakage, an assumption made is that prior to TX IQ mismatch correction, the LO leakage has been corrected. In the case of the feed-forward scheme (i.e. first method) described supra, any residual LO leakage will bias the results. This is not true, however, for the feedback scheme (i.e. closed loop method 2) because the closed loop scheme does not calculate absolute values from the power measurements, but rather only uses the differences between pairs of measurements. Thus, any residual LO leakage that does show up in the power detector measurements cancels out and does not appear in the correction matrix results. Note that assuming the DC levels in the pairs of measurements are the same, the residual DC can be ignored as well.

Regarding power detector inaccuracies, the power detector curve of output voltage versus input power is known but suffers from a relatively large level of uncertainty. Thus, it is preferable to ensure that the signals transmitted during calibration have the same output power level. This is especially true with large initial IQ mismatches, which are likely to lead to estimation errors when using the feed-forward scheme described supra. For example, estimation errors are likely in the case of an output power reading for a signal 3 dB stronger (assuming initial gain mismatch of 3 dB) which results in a power detector word which is not exactly 3 dB different.

In the case of the closed loop second method, even an error in the initial calculation of power readings will not result in errors in the final correction matrix. This is because the mechanism is iterative and ultimately, at convergence, the four power levels are different and the readings are likely to be more accurate. Thus, the accuracy of the power detector is not as critical as with the open loop mechanism which requires a very linear output/input power curve. The only requirement for the power detector in the case of the closed loop mechanism is that the output/input power curve be monotonic.

Noise, including both quantization and thermal, can be ignored since the signals being transmitted are relatively strong. Further, since the closed loop mechanism is iterative, eventually the effects of noise will be corrected considering the use of the $\alpha$ and $\beta$ correction factor coefficients. In addition, at the time of convergence, the $\alpha$ and $\beta$ correction factor coefficients are so small (assuming gear shifting is used) that the effects of any noise present is minor.

Simulation Results

Figure 10:
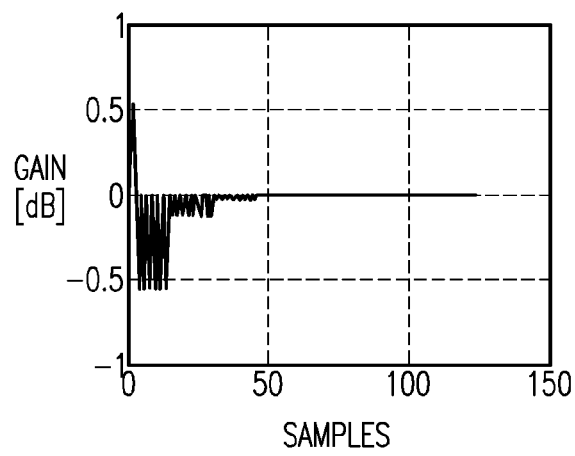
FIG. 10 is a graph illustrating example gain mismatch over a plurality of samples.
Figure 11:
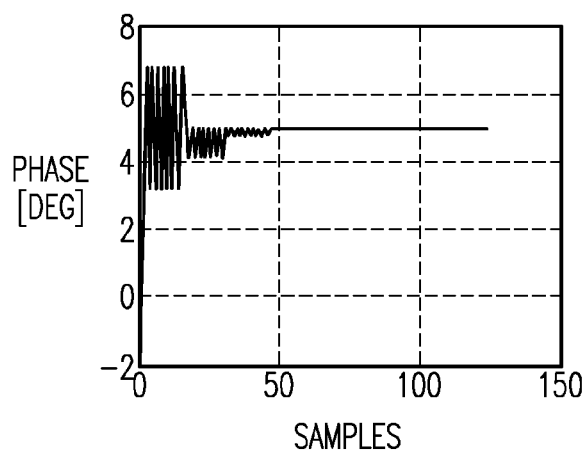
FIG. 11 is a graph illustrating example phase mismatch over a plurality of samples.
Figure 12:
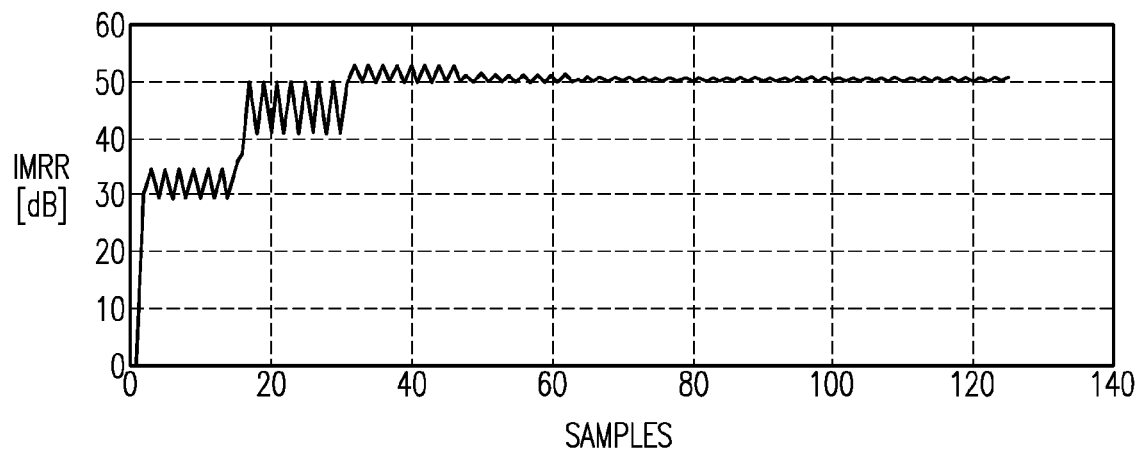
FIG. 12 is a graph illustrating example image rejection ratio over a plurality of samples.

Assuming a goal of the TX IQ mismatch correction of the invention is to achieve an image rejection ratio (IMRR) of at least 35 dB, several simulations are presented below that show this goal was met and surpassed. FIGS. 10, 11, 12 are simulation results for TX IQ correction in the case of no impairments. A graph illustrating example gain mismatch over a plurality of samples is shown in FIG. 10. A graph illustrating example phase mismatch over a plurality of samples is shown in FIG. 11. A graph illustrating example image rejection ratio over a plurality of samples is shown in FIG. 12.

In these three simulations, the same example was used where the initial gain mismatch was 2 dB and the initial phase mismatch was 5 degrees. Note that the jump in IMRR is due to the use of gear shifting. Initially, the correction factor coefficients have larger values. After a few iterations, they become smaller resulting in the finer IMRR steps. The high value of 50 dB IMRR achieved in this example was obtained with only the required signal present (i.e. no impairments). Thus, the IMRR threshold of 35 dB (the system target to the TX IQ correction) is easily obtained in this case.

Figure 13:
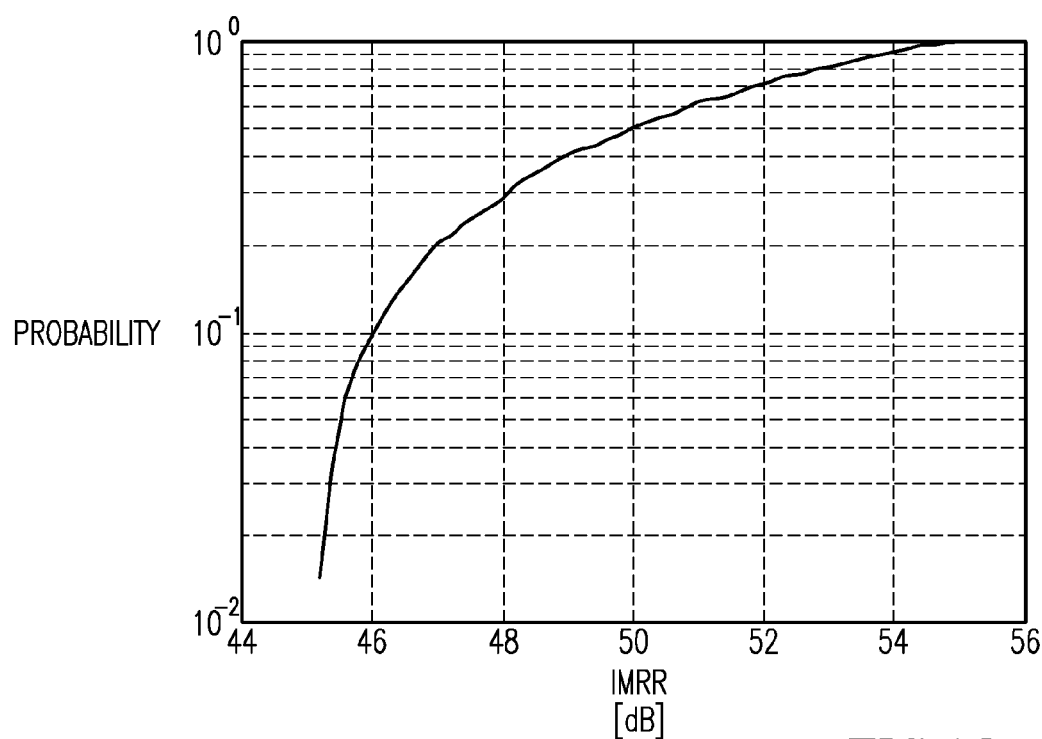
FIG. 13 is a graph illustrating IQ statistical performance of the transmitter.

A graph illustrating IQ statistical performance of the transmitter is shown in FIG. 13. This graph was generated by executing the feedback scheme (i.e. closed loop scheme) of the TX IQ calibration mechanism 1000 times. Each time a different initial gain and phase mismatch was selected. The IMRR once convergence was reached was captured and displayed in the graph. Note that the target IMRR of 30 dB is achievable with a very large margin. The graph also shows that for 90% of the time, the IMRR is better than 46 dB.

Figure 14:
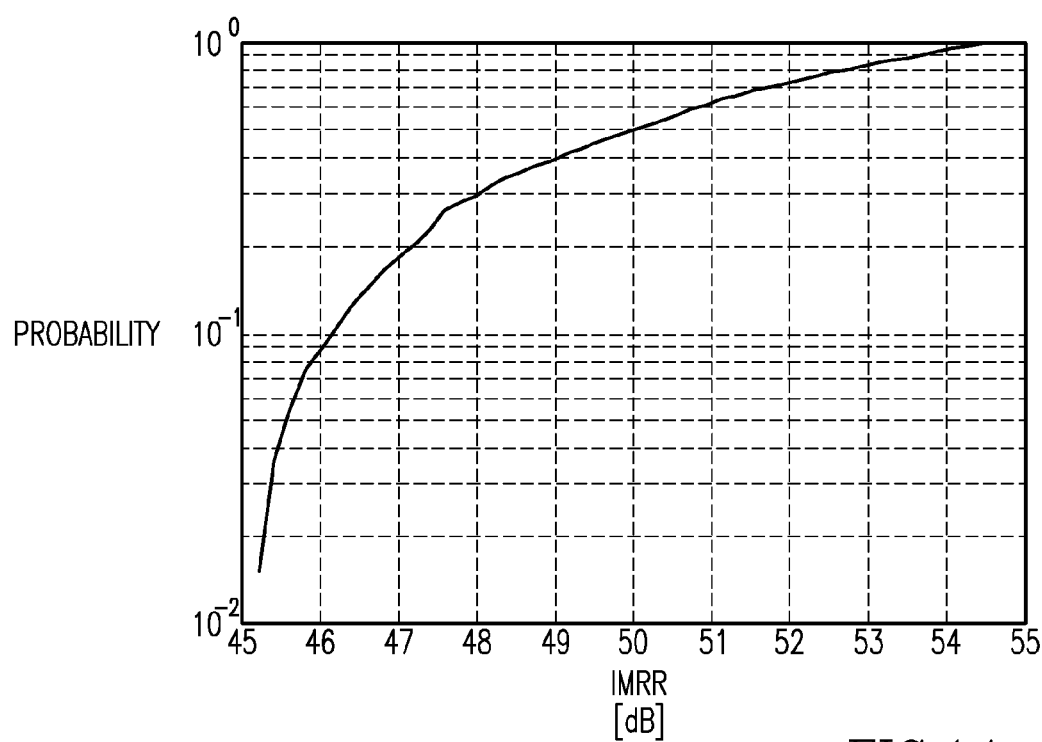
FIG. 14 is a graph illustrating IQ statistical performance of the transmitter in the presence of DC.

A graph illustrating IQ statistical performance of the transmitter in the presence of DC (residual LO leakage) is shown in FIG. 14. Normally, as in the open loop case of the first method, the residual LO leakage causes gain and phase mismatch. The residual LO leakage the IQ correction mechanism 'sees' is approximately 12 dB below the transmitted signal power (otherwise the UWB mask is not met). To ensure that the TX IQ correction is sufficiently robust in the presence of DC, an independent DC level uniformly distributed with average RMS power of 12 dB below the signal level was injected to the I and Q paths separately. The algorithm was executed 1000 times to yield the results depicted in the graph of FIG. 14.

The results reveals that the residual LO leakage does not degrade the TX IQ mismatch correction as 90% of the time, the IMRR is better than 46 dB. Note that as described supra, the noise levels introduced by thermal and quantization noise are minimal. The quantization noise caused by the analog to digital converter, which samples the filtered diode output, was selected such that it would not degrade performance.

Thus, it is apparent that feedback based IQ calibration scheme is significantly robust to real world RF impairments (e.g., LO leakage, noise, etc.). The simulation results shown above show that convergence is easily achievable with a relatively small number of iterations. Further, implementation of the IQ calibration mechanism has the advantage of requiring only simple calculations (additions, shifts, etc.) and no pre-calibrations (e.g., LO leakage, power detector, etc.) are needed.

Mobile Device Incorporating the IQ Calibration Mechanism

Figure 15:
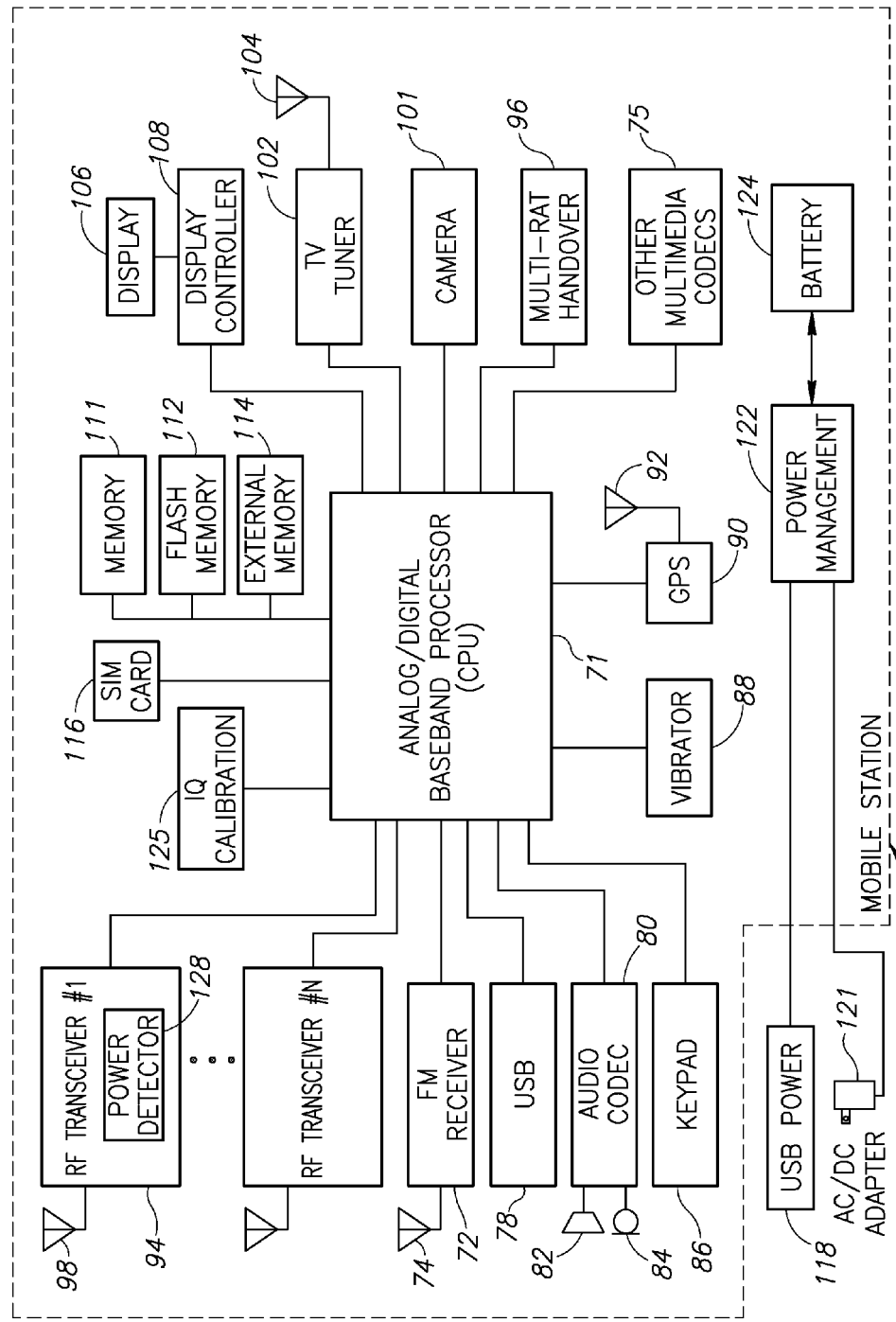
FIG. 15 is a simplified block diagram illustrating an example communication device incorporating the IQ calibration mechanism of the present invention.

A simplified block diagram illustrating an example mobile communication device incorporating the IQ calibration mechanism of the present invention within multiple radio transceivers is shown in FIG. 15. Note that the mobile device may comprise any suitable wired or wireless device such as multimedia player, mobile communication device, cellular phone, smartphone, PDA, Bluetooth device, etc. For illustration purposes only, the device is shown as a mobile device, such as a cellular phone. Note that this example is not intended to limit the scope of the invention as the IQ calibration mechanism of the present invention can be implemented in a wide variety of communication devices.

The mobile device, generally referenced 70, comprises a baseband processor or CPU 71 having analog and digital portions. The mobile device may comprise a plurality of RF transceivers 94 and associated antennas 98. RF transceivers for the basic cellular link and any number of other wireless standards and Radio Access Technologies (RATs) may be included. Examples include, but are not limited to, Global System for Mobile Communication (GSM)/GPRS/EDGE 3G; CDMA; WiMAX for providing WiMAX wireless connectivity when within the range of a WiMAX wireless network; Bluetooth for providing Bluetooth wireless connectivity when within the range of a Bluetooth wireless network; WLAN for providing wireless connectivity when in a hot spot or within the range of an ad hoc, infrastructure or mesh based wireless LAN network; near field communications; UWB; etc. One or more of the RF transceivers may comprise additional antennas to provide antenna diversity which yields improved radio performance. The mobile device may also comprise internal RAM and ROM memory 110, Flash memory 112 and external memory 114.

In accordance with the invention, the mobile device comprises an IQ calibration block 125 operative to implement the IQ calibration mechanism described supra. The IQ calibration mechanism may be implemented as hardware, software or a combination of hardware and software. For example, it may be implemented as a software task in combination with hardware assist circuits (block 125 shows the combination). Alternatively, it may be implemented within one or more RF transceivers 94. The power detection function for generating the output power measurements is provided by the power detector block 128 which functions to sample the output power of the RF transceiver.

Several user-interface devices include microphone(s) 84, speaker(s) 82 and associated audio codec 80 or other multimedia codecs 75, a keypad for entering dialing digits 86 and for other controls and inputs, vibrator 88 for alerting a user, camera and related circuitry 100, a TV tuner 102 and associated antenna 104, display(s) 106 and associated display controller 108 and GPS receiver 90 and associated antenna 92. A USB or other interface connection 78 (e.g., SPI, SDIO, PCI, etc.) provides a serial link to a user's PC or other device. An FM transceiver 72 and antenna 74 provide the user the ability to listen to FM broadcasts as well as the ability to transmit audio over an unused FM station at low power, such as for playback over a car or home stereo system having an FM receiver. SIM card 116 provides the interface to a user's SIM card for storing user data such as address book entries, user identification, etc.

Portable power is provided by the battery 124 coupled to power management circuitry 122. External power may be provided via USB power 118 or an AC/DC adapter 121 connected to the battery management circuitry 122, which is operative to manage the charging and discharging of the battery 124.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of IQ calibration for use in a radio frequency (RF) transmitter, said method comprising the steps of:
    transmitting a plurality of calibration signals and detecting a corresponding power output to generate a plurality of power detection signals thereby;
    estimating a gain mismatch and a phase mismatch based on differences of said plurality of power detection signals;
    updating an IQ correction matrix based on said gain mismatch estimate and said phase mismatch estimate; and
    repeating said steps of transmitting, detecting, estimating and updating until a desired convergence is reached,
    wherein said plurality of power detection signals comprises:
        a first power signal $P_1=\alpha^2$;
        a second power signal $P_2=1$;
        a third power signal
        $$P_3 = \frac{1}{2}(a^2 + 1 + \sin(2\varphi));$$
        a fourth power signal
        $$P_4 = \frac{1}{2}(a^2 + 1 - \sin(2\varphi));$$
        and
    wherein $\alpha$ denotes gain mismatch and $\varphi$ denotes phase mismatch.

2. The method according to claim 1, wherein said plurality of calibration signals comprise:
    a first tone transmitted only on an I path;
    a second tone transmitted only on a Q path;
    a third tone transmitted only on both I and Q paths; and
    a complex conjugate of said third tone.

3. The method according to claim 1, wherein said step of estimating uses an initial estimate of zero for both gain and phase mismatch.

4. The method according to claim 1, wherein said step of estimating said gain mismatch comprises calculating the difference $P_1\text{-}P_2$.

5. The method according to claim 1, wherein said step of estimating said phase mismatch comprises calculating the difference $P_3\text{-}P_4$.

6. The method according to claim 1, further comprising the step of applying said updated correction matrix to predistortion of data prior to transmission.

7. The method according to claim 1, further comprising the step of applying gear shifting to said step of estimating thereby providing quick convergence while minimizing residual error.

8. A method of IQ calibration for use in a radio frequency (RF) transmitter, said method comprising the steps of:
    transmitting a plurality of calibration signals and measuring a corresponding power output to generate a plurality of power measurement signals thereby;
    first determining a first direction of correction for a gain mismatch estimate as a function of a first difference of said power measurement signals and generating an updated gain mismatch estimate therefrom;
    second determining a second direction of correction for a phase mismatch estimate as a function of a second difference of said power measurement signals and generating an updated phase mismatch estimate therefrom;
    updating an IQ correction matrix in accordance with said updated gain mismatch estimate and said updated phase mismatch estimate; and
    repeating said steps of transmitting, first determining, second determining, and updating until a stopping criterion is reached,
    wherein said plurality of power detection signals comprises:
        a first power signal $P_1=\alpha^2$;
        a second power signal $P_2=1$;

a third power signal $$P_3 = \frac{1}{2}(a^2 + 1 + \sin(2\varphi));$$

a fourth power signal $$P_4 = \frac{1}{2}(a^2 + 1 - \sin(2\varphi));$$

and
wherein α denotes gain mismatch and φ denotes phase mismatch.

9. The method according to claim 8, wherein said plurality of calibration signals comprise:
   a first tone transmitted only on an I path;
   a second tone transmitted only on a Q path;
   a third tone transmitted only on both I and Q paths; and
   a complex conjugate of said third tone.

10. The method according to claim 8, wherein an initial gain mismatch estimate and initial phase mismatch estimate of zero are used in said steps of first determining and second determining.

11. The method according to claim 8, wherein said first direction is determined based on the difference between said first power signal and said second power signal.

12. The method according to claim 8, wherein said second direction is determined based on the difference between said third power signal and said fourth power signal.

13. The method according to claim 8, further comprising the step of applying said updated correction matrix to predistortion of data prior to transmission.

14. The method according to claim 8, further comprising the step of applying gear shifting to said step of estimating thereby providing quick convergence while minimizing residual error.

15. An apparatus for IQ calibration for use in a radio frequency (RF) transmitter, comprising:
   a calibration signal module operative to transmit a plurality of calibration signals;
   a power detector operative to detect a power at an output of said transmitter
   in response to said calibration signals and to generate a plurality of power detection signals thereby;
   a correction matrix module operative to:
      update a gain mismatch estimate and a phase mismatch estimate in accordance with differences between said power detection signals; and
      iteratively update an IQ correction matrix in accordance with updated gain and phase mismatch estimates
   wherein said plurality of power detection signals comprises:
   a first power signal $P_1 = \alpha^2$;
   a second power signal $P_2 = 1$;
   a third power signal $$P_3 = \frac{1}{2}(a^2 + 1 + \sin(2\varphi));$$

a fourth power signal $$P_4 = \frac{1}{2}(a^2 + 1 - \sin(2\varphi));$$

and wherein α denotes gain mismatch and φ denotes phase mismatch.

16. The apparatus according to claim 15, wherein said plurality of calibration signals comprise:
   a first tone transmitted only on an I path;
   a second tone transmitted only on a Q path;
   a third tone transmitted only on both I and Q paths; and
   a complex conjugate of said third tone.

17. The apparatus according to claim 15, further comprising a predistortion module operative to apply said updated correction matrix to predistortion of data prior to transmission.

18. The apparatus according to claim 15, wherein said correction matrix module is operative to apply gear shifting to update said gain and phase mismatch estimates thereby providing quick convergence while minimizing residual error.

19. The apparatus according to claim 15, wherein said correction matrix module is operative to update said gain mismatch based on the difference between said first power signal and said second power signal.

20. The apparatus according to claim 15, wherein said correction matrix module is operative to update said phase mismatch based on the difference between said third power signal and said fourth power signal.

21. A radio frequency (RF) transmitter, comprising:
   a digital baseband operative to generate a digital baseband signal;
   digital to analog converter operative to convert said digital baseband signal to an analog baseband signal;
   an upconverter operative to translate said analog baseband signal to a higher transmit frequency;
   a power amplifier operative to amplify said upconverted signal for transmission over an RF channel;
   a power detector operative to measure a power output of said power amplifier; and
   said digital baseband comprising an IQ calibration module operative to:
      transmit a plurality of calibration signals;
      generate a plurality of power detection signals in response to the power output of said power amplifier in response to said calibration signals;
      update a gain mismatch estimate and a phase mismatch estimate in accordance with differences between said power detection signals; and
      iteratively update an IQ correction matrix in accordance with updated gain and phase mismatch estimates,
   wherein said plurality of power detection signals comprises:
   a first power signal $P_1 = \alpha^2$;
   a second power signal $P_2 = 1$;
   a third power signal $$P_3 = \frac{1}{2}(a^2 + 1 + \sin(2\varphi));$$

a fourth power signal $$P_4 = \frac{1}{2}(a^2 + 1 - \sin(2\varphi));$$

and
wherein α denotes gain mismatch and φ denotes phase mismatch.

22. The transmitter according to claim 21, wherein said plurality of calibration signals comprise:
   a first tone transmitted only on an I path;
   a second tone transmitted only on a Q path;
   a third tone transmitted only on both I and Q paths; and
   a complex conjugate of said third tone.

23. The transmitter according to claim 21, wherein said digital baseband is further operative to apply said updated correction matrix to predistortion of data prior to transmission.

24. The transmitter according to claim 21, wherein said IQ calibration module is operative to apply gear shifting to update said gain and phase mismatch estimates thereby providing quick convergence while minimizing residual error.

25. A communications device, comprising:
   at least one radio comprising a transmitter;
   said transmitter comprising an IP calibration module, said IP calibration module comprising:
      a calibration signal module operative to transmit a plurality of calibration signals;
      a power detector operative to detect a power at an output of said transmitter in response to said calibration signals and to generate a plurality of power detection signals thereby;
      a correction matrix module operative to:
         update a gain mismatch estimate and a phase mismatch estimate in accordance with differences between said power detection signals; and
         iteratively update an IQ correction matrix in accordance with updated gain and phase mismatch estimates,
   wherein said plurality of power detection signals comprises:
      a first power signal $P_1 = \alpha^2$;
      a second power signal $P_2 = 1$;
      a third power signal
      $$P_3 = \frac{1}{2}(a^2 + 1 + \sin(2\varphi));$$
      a fourth power signal
      $$P_4 = \frac{1}{2}(a^2 + 1 - \sin(2\varphi));$$
      and
      wherein $\alpha$ denotes gain mismatch and $\phi$ denotes phase mismatch.

26. The communications device according to claim 25, wherein said plurality of calibration signals comprise:
   a first tone transmitted only on an I path;
   a second tone transmitted only on a Q path;
   a third tone transmitted only on both I and Q paths; and
   a complex conjugate of said third tone.

27. The communications device according to claim 25, wherein said digital baseband is further operative to apply said updated correction matrix to predistortion of data prior to transmission.

28. The communications device according to claim 25, wherein said correction matrix module is operative to apply gear shifting to update said gain and phase mismatch estimates thereby providing quick convergence while minimizing residual error.

\* \* \* \* \*